July 27, 1937.   A. F. REHNBERG   2,088,117
HOPPER FEED MECHANISM
Original Filed Dec. 16, 1933
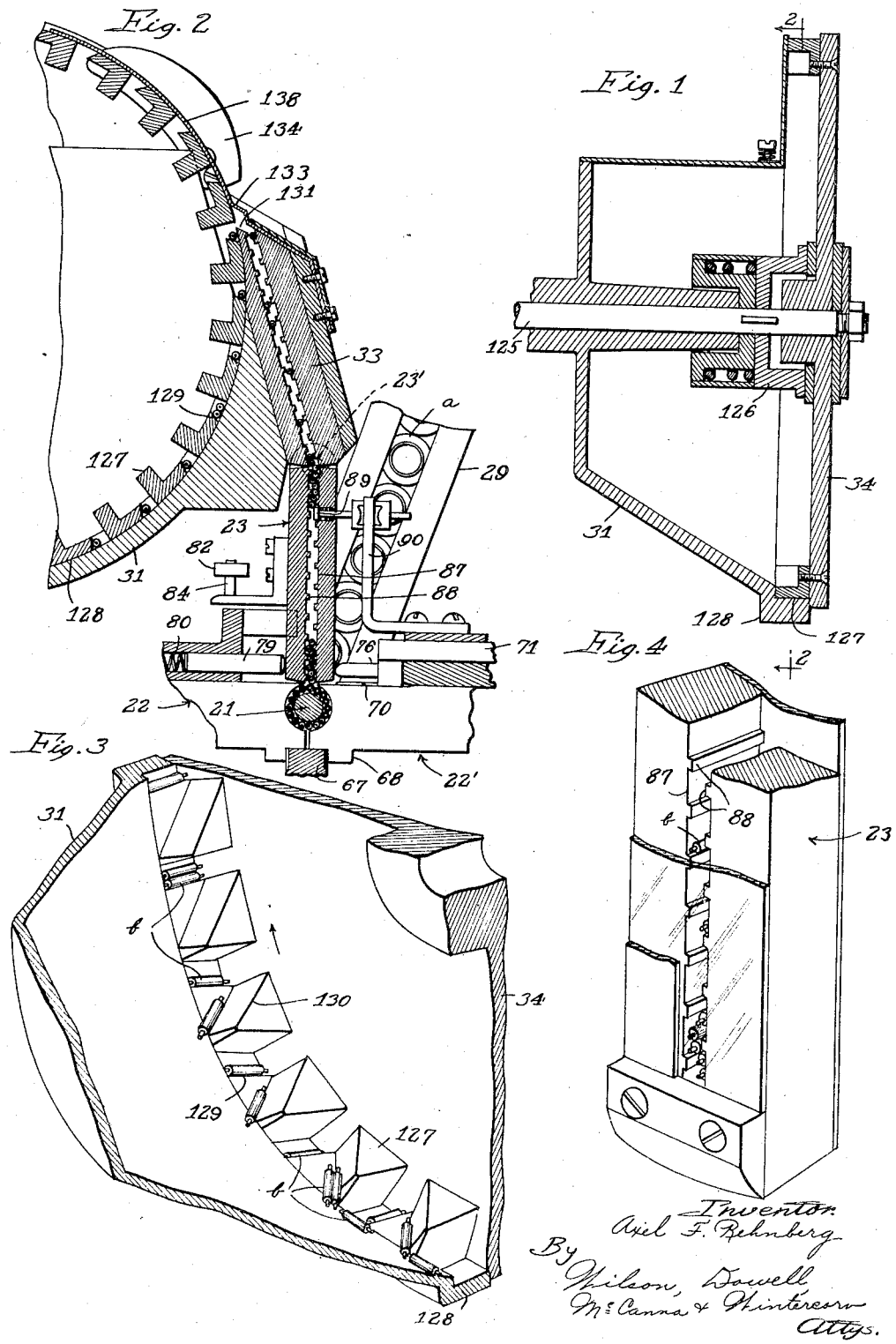

Patented July 27, 1937

2,088,117

UNITED STATES PATENT OFFICE 2,088,117

HOPPER FEED MECHANISM

Axel F. Rehnberg, Rockford, Ill., assignor, by mesne assignments to Borg-Warner Corporation, Chicago, Ill., a corporation of Illinois Original application December 16, 1933, Serial No. 702,683. Divided and this application February 24, 1934, Serial No. 712,849

13 Claims. (Cl. 221—135)

This is a division of my application, Serial No. 702,683, filed December 16, 1933, relating to Roller bearing assembling machine.

The principal object of the present invention is to provide an improved hopper feed mechanism for dispensing rollers or other like articles one or more at a time in parallel relation from a heap in the hopper, and preferably in timed relation to the operation of the machine to which the articles are to be delivered.

The mechanism of my invention comprises a rotary disk having spaced projections on the periphery working in the rim of a hopper and shaped so that as the disk turns, rollers that have not found their way into the spaces are caused to ride off the projections by gravity, the rollers in the spaces being discharged at a certain point from the hopper into the throat of a stationary chute for delivering rollers to an oscillating chute. The hopper includes at the throat a yieldable leaf spring which will allow excess rollers to be thrown back into the hopper to prevent jamming.

The invention will be better understood as reference is made in the following description to the accompanying drawing, in which—

Figure 1 is a longitudinal section through the hopper showing the rotary disk with its peripheral projections working in the rim of the hopper;

Fig. 2 is a cross-section on the line 2—2 of Figure 1 showing the stationary chute and oscillating chute therebeneath in connection with a portion of a roller bearing assembling machine to which rollers are delivered from the oscillating chute;

Fig. 3 is a perspective view looking at the inside of the feed mechanism and illustrating its mode of operation, and Fig. 4 is a perspective view of the oscillating chute with parts broken away and appearing in section to better illustrate the construction and mode of operation.

The same reference numerals are applied to corresponding parts throughout the views.

Before proceeding with the description of this invention, it should be understood that the hopper feed mechanism of my invention, while specially designed and adapted for use on a roller bearing assembling machine for delivery of rollers to the assembling mechanism for assembly in bearing blocks for trunnion type universal joints, is not to be regarded as limited to that application. In other words, the hopper feed mechanism of this invention is adapted for use in the handling of rollers, pins, needles, and in fact, any articles generally similar in form to the bearing rollers *b* appearing in Figs. 3 and 4, and it should also be understood that the mechanism may be enlarged or diminished in size to accommodate larger or smaller sized articles.

The roller bearing assembling machine is, of course, fully illustrated and described in the parent application. Fig. 2 shows enough of the machine for the present purposes, to wit: the pilot plunger designated generally by the numeral 21 on which the lowest one of the retainer rings *a* in chute 29 is received and around which the rollers *b* are grouped in front of the aforesaid ring and between the jaws 22—22', preliminary to the transfer of the rollers and ring into a bearing block. 67 is a cam which cooperates with lugs 68 on the jaws to hold the jaws apart sufficiently to admit the rollers discharged from the oscillating roller feed chute 23, the cam 67 being arranged to move to a retracted position to allow the jaws to close after the annular zone around the plunger 21 is filled. A finger 70 is slidable over the jaws to close the small gap left between the jaws at the top when the cam 67 is retracted, so that there is no opportunity for one of the rollers to jump out in the closing of the jaws. The finger 70 is operable by means of a slide 71 in timed relation to the operation of cam 67. When the jaws are closed and the finger 70 covers the gap, a slide 76 engages the lower end of the chute 23 and moves it to the left to an inoperative out-of-the-way position. The chute is pivoted at its upper end at 23', just below the inclined stationary chute 33. It is while the chute 23 is moved to the left that any rollers stacked in the passage 87 above the gate 89 are free to roll down to fill the chute 23 below the gate. The gate is carried loosely on a bracket 90 and is in the form of a spring pressed plunger normally movable toward closed position. The gate is located so that when the chute is filled as just described, there will certainly be more than enough rollers present in the passage 87 below the gate to fill the space between the jaws 22—22'. There are transverse ridges 88 on opposite walls of the passage 87 in staggered relationship and properly spaced lengthwise of the passage to allow the rollers to feed through in a zigzag course in the oscillation or vibration of the chute, as clearly indicated in Fig. 4. The rollers are not free to tumble in hit or miss fashion through the chutes but are kept in approximate parallelism by reason of contact with one after the other of the ridges 88 first on one side and then on the other side of the passage. This feature, taken together with the vibration of the chute 23 avoids any likelihood of rollers becoming lodged at some point in the chute itself or at the point of discharge of rollers in between the jaws 22—22'. There is sufficient pitch to the passage in the chute 33 for the rollers to pass down freely by gravity alone. The vibration or oscillation of the chute 23 is secured by a spring pressed plunger 79 tending to move the chute in one direction under action of spring 80, and an arm 82 of a bell crank lever which is given impulse through a suitable mechanism to move the chute in the opposite direction through pivotal connection therewith at 84. The front wall of the chute 23 is of celluloid or other transparent material, as illustrated in Fig. 4, so that the operator can see into the passage 87 to observe whether rollers are feeding through properly. So much for an understanding of that part of the roller bearing assembling machine in connection with which the hopper feed mechanism of my invention is used.

In accordance with my invention, the hopper 31 containing the rollers b is supported at a suitable elevation with respect to the plunger 21 and jaws 22—22', and the rollers are fed from this hopper downwardly through the chute 33 into the chute 23 in the turning of a disk 34. The rollers are fed one or two at a time from the hopper 31 off the periphery of the disk 34 into the chute 33 as should be clear from Figs. 2 and 3. As indicated in Figure 1, a shaft 125 that is positively driven in timed relation with the rest of the machine, as disclosed in the parent application, is keyed to a drum 126 spring-pressed toward frictional engagement with the disk 34 to provide frictional drive. The disk 34 carries a plurality of lugs 127 on the inside thereof adjacent the periphery arranged to ride around the inside of the rim 128 of the hopper 31. These lugs, as clearly appears in Fig. 2, provide shoulders 129 on the front thereof on which rollers will lodge in the turning of the disk relative to the hopper, as the shoulders pass the lowermost portion of the hopper and are therefore moving through the mound of rollers that have been dumped into the hopper. There is sufficient space between the lugs so that two rollers may be picked up on the shoulder of one lug, although there will usually be only one, as indicated in Fig. 3. The front of each lug is beveled off as at 130 next to the shoulder 129 so that the shoulder is no thicker than the rollers to be fed thereby from the hopper, and any excess rollers that have not found their way into the space between the lugs and in front of the shoulders 129 will be deflected away from the disk 34 back into the hopper. The inclination of these surfaces 130 positively insures riding off of any rollers that may remain thereon after lugs pass through the mound of rollers in the hopper; the rollers will drop off by gravity long before they reach the point of discharge into the chute 33. At 131 is shown the throat leading into the passage through the chute 33. The throat is inclined downwardly and as the shoulders 129 come into position alongside the throat, their inclination is enough to insure rolling of the rollers off the shoulders and into the chute 33, as must be clear from inspection of Fig. 2. A leaf spring 138 is mounted on the upper end of the chute 33 and is curved to form an extension of the rim 128 above the point of discharge into the hopper 33, so that the lugs 127 leaving the throat 131 ride along the inside of said spring. This spring is shaped as indicated at 133 to provide a small pocket above the throat 131 to receive the topmost roller in the chute 33, and, if another roller is crowded in, such that jamming or binding would otherwise occur, the spring 138 will flex sufficiently to allow the excess roller or rollers to ride up under the spring and eventually find a space between lugs 127 through which to drop back into the hopper, aided by the resilience of the spring 138. Guards 134 flanking the spring 138 prevent rollers that get under the spring 138 from dropping off the disk 34 alongside the hopper.

It is believed the foregoing description conveys a good understanding of the various objects and advantages of my invention, and the appended claims have been drawn with a view to covering all legitimate modifications and adaptations.

I claim:

1. A dispenser or feeder for rollers and the like comprising an open-sided hopper having an arcuate portion on the open side thereof, a rotary disk in said arcuate portion closing the open side of the hopper, the disk having circumferentially-spaced lugs projecting laterally from the peripheral portion of the disk and movable around the inside of the arcuate portion of the hopper, the same being adapted to catch rollers therebetween and convey the same from the bottom of the hopper to an elevated discharge point, said lugs having one portion of the leading face thereof conformed to provide a shoulder thick enough to support and move a roller, and another portion of the leading face conformed to provide a surface next to the shoulder and at an angle thereto slanted so as to deflect excess rollers away from the disk and back into the hopper in the turning of the disk.

2. A structure as set forth in claim 1 including a feed chute having a throat portion disposed so as to receive rollers discharged from said hopper, and a resilient shield member over said throat portion and extending in an arc therefrom a certain distance around the periphery of the disk in the direction of rotation of the disk, for the purpose described.

3. A device of the character described comprising an open sided hopper having an arcuate portion, a rotary disk in the arcuate portion closing the open side of the hopper, the disk having circumferentially spaced lugs projecting laterally from the peripheral portion of the disk and movable around the inside of the arcuate portion of the hopper to pick up articles from the bottom of the hopper and convey the same to an elevated discharge opening provided in said arcuate portion, said lugs having one portion of the leading face thereof each conformed to provide a shoulder of sufficient thickness to support and move one article, the rest of the leading face being conformed at an angle to the shoulder and slanted so as to deflect other articles away from the disk and back into the hopper in the turning of the disk.

4. A device of the character described comprising an open sided hopper having a ring-shaped portion, a rotary disk in the ring-shaped portion closing the open side of the hopper, the disk having circumferentially spaced lugs projecting laterally from the peripheral portion of the disk and movable around the inside of the ring-shaped portion of the hopper to pick up articles from the bottom of the hopper and convey the same to an elevated discharge point, a downwardly projecting chute having a throat portion at its upper end adjacent the aforesaid discharge point to receive articles discharged, and an inwardly springing resilient shield member over said throat and extending in an arc a certain distance around the periphery of the disk above the discharge point and in the direction of rotation of the disk, arranged to yield outwardly upon engagement with the inside thereof of articles in the throat and to retain the same for subsequent dropping back into the hopper between the lugs on the disk.

5. In a device of the class described, a hopper having a discharge opening, a rotary disk for elevating articles from inside the hopper to the discharge opening, said disk having circumferentially spaced lugs between which the articles are received for elevation, a discharge chute extending away from the discharge opening and having a throat portion for conducting the articles into the chute, and an arcuate spring member extending from the throat around the periphery of the disk in the direction of rotation of the latter, said spring normally tending to move inwardly toward engagement with the spaced lugs on the disk but being movable outwardly relative to said lugs for the purpose described.

6. A device as set forth in claim 5 including guard members flanking said arcuate spring on opposite sides of said disk to retain articles between the spring and the periphery of the disk for the purpose described.

7. In a device of the class described, a hopper having a discharge opening, a rotary disk for elevating articles from inside the hopper to the discharge opening, said disk having circumferentially spaced lugs between which the articles are received for elevation, a discharge chute extending away from the discharge opening and having a throat portion for conducting the articles into the chute, and an arcuate member extending from the throat around the periphery of the disk in the direction of rotation of the latter, said member being normally disposed in close proximity to the periphery of the disk but being movable outwardly relative thereto for the purpose described.

8. A device as set forth in claim 7 including guard members flanking said arcuate member on opposite sides of said disk to retain articles between the member and the periphery of the disk for the purpose described.

9. A feed mechanism for rollers and articles of like shape comprising a hopper having an arcuate bottom and an arcuate channel provided therein in depressed concentric relation to the bottom, a rotary feeding disk having circumferentially spaced lugs projecting laterally from the peripheral portion thereof and movable in the aforesaid channel so that in their travel through a heap of rollers or other articles in the bottom of the hopper the tops of the lugs are disposed substantially flush with the bottom of the hopper, the lugs being adapted to catch the rollers or other articles therebetween and convey the same from the bottom of the hopper in the channel to an elevated discharge point, said lugs each having another portion arranged to project from the channel above the bottom of the hopper, the leading face of each of said portions being disposed at an angle to the leading edge of the associated lug and slanted so as to deflect excess rollers or other articles away from the disk and back into the hopper in the turning of the disk.

10. A dispenser of the character described comprising, a rotary disk arranged to operate in an upright position, a hopper for containing the articles to be dispensed, said hopper having a wall adjacent to said disk formed to direct said articles toward said disk, means providing an article discharge point through said hopper wall in register with the periphery of said disk at a point intermediate the lowermost and uppermost portions of the upright disk, the disk having circumferentially spaced lugs projecting laterally from the peripheral portion thereof for movement through the articles in the hopper, whereby to catch articles therebetween and convey the same to said elevated discharge point, said lugs having one portion of the leading face thereof conformed to provide a shoulder of sufficient dimensions to support and carry one article only, and another portion of the leading face conformed to provide a surface next to the shoulder and at an angle thereto slanted so as to deflect excess articles away from the disk and toward the hopper in the turning of the disk.

11. A dispenser of the character described comprising, a rotary disk arranged to operate in an upright position, a hopper for containing the articles to be dispensed, said hopper having a wall adjacent to said disk formed to direct said articles toward said disk, means providing an article discharge point through said hopper wall in register with the periphery of said disk at a point intermediate the lowermost and uppermost portions of the upright disk, the disk having means on the peripheral portion thereof providing one set of circumferentially spaced shoulders projecting laterally from the disk substantially at right angles thereto, each shoulder being of sufficient dimensions to support and carry one article only therewith in the turning of the disk whereby to convey the article to said elevated discharge point, and means providing another set of shoulders similarly spaced circumferentially on the peripheral portion of the disk projecting laterally at obtuse angles from the disk to deflect articles away from the disk in the direction of the hopper in the turning of the disk, the obtuse angled shoulders being located radially inwardly relative to the disk with relation to said right angle article support shoulders.

12. A device of the character described comprising, in combination, a rotary disk arranged to operate in an upright position, a hopper for containing articles to be dispensed, said hopper having a wall adjacent to said disk formed to direct said articles toward said disk, means providing an article discharge point through said hopper wall in register with the periphery of said disk at a point intermediate the lowermost and uppermost portions of the upright disk, the disk having circumferentially spaced shoulders on the peripheral portion thereof projecting laterally from the disk and arranged to carry articles thereon to said elevated discharge point, a downwardly projecting chute having a throat portion at its upper end adjacent said discharge point to receive the articles discharged from said shoulders, and an inwardly springing resilient metal shield member over said throat and extending in an arc a predetermined distance around the periphery of the disk above the discharge point and in the direction of rotation of the disk, said shield member fixed at one end and being arranged to yield outwardly from the adjacent peripheral portion of the disk and from the throat of the chute upon engagement of the inside thereof by articles in said throat and to retain said articles for subsequent dropping back into the hopper from between the shoulders on the disk.

13. In a feed mechanism of the character described, a rotary feeding disk arranged to operate in an upright position, a hopper for containing rollers or other articles of like shape to be fed, said hopper having a wall adjacent to said disk formed to direct said articles toward said disk, means providing an article discharge point through said hopper wall in register with the periphery of said disk at a point intermediate the lowermost and uppermost portions of the upright disk, the disk being operable in a depressed channel provided therefor in the hopper and having means on the peripheral portion thereof operable in the channel providing one set of circumferentially spaced shoulders projecting laterally from the disk substantially at right angles thereto, each shoulder being of sufficient dimensions to support and carry one article only therewith in the turning of the disk whereby to convey the article to said elevated discharge point, means providing another set of shoulders similarly spaced circumferentially on the peripheral portion of the disk projecting laterally at obtuse angles from the disk to deflect articles away from the disk and channel in the direction of said hopper in the turning of the disk, the obtuse angled shoulders being located radially inwardly relative to the disk with relation to said right angle shoulders, whereby said obtuse angled shoulders are operable in a plane radially inward of said shoulders and outside the channel as the shoulders move through the articles in the hopper.

AXEL F. REHNBERG.